United States Patent
Hoshiba

(10) Patent No.: US 9,393,957 B2
(45) Date of Patent: Jul. 19, 2016

(54) CONTROL DEVICE FOR HYBRID VEHICLE FOR CONTROLLING THE HYBRID VEHICLE WHEN A COLLISION IS DETECTED

(71) Applicant: Takeshi Hoshiba, Anjo (JP)

(72) Inventor: Takeshi Hoshiba, Anjo (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/421,300

(22) PCT Filed: Nov. 6, 2013

(86) PCT No.: PCT/IB2013/002774
§ 371 (c)(1),
(2) Date: Feb. 12, 2015

(87) PCT Pub. No.: WO2014/076563
PCT Pub. Date: May 22, 2014

(65) Prior Publication Data
US 2015/0217764 A1    Aug. 6, 2015

(30) Foreign Application Priority Data

Nov. 16, 2012  (JP) .................................. 2012-252711

(51) Int. Cl.
*B60L 9/00*    (2006.01)
*B60W 30/08*   (2012.01)
(Continued)

(52) U.S. Cl.
CPC .................. *B60W 30/08* (2013.01); *B60K 6/24* (2013.01); *B60K 6/26* (2013.01); *B60K 6/387* (2013.01); *B60K 6/48* (2013.01); *B60K 28/14* (2013.01); *B60W 10/02* (2013.01); *B60W 10/06* (2013.01); *B60W 10/08* (2013.01); *B60W 20/50* (2013.01); *B60K 2006/4825* (2013.01); *B60W 2030/082* (2013.01); *B60W 2510/0208* (2013.01); *B60W 2510/06* (2013.01); *B60W 2510/0638* (2013.01); *B60W 2510/0652* (2013.01);
(Continued)

(58) Field of Classification Search
CPC ...... B60W 10/06; B60W 20/00; B60K 28/14; B60K 6/24; B60K 6/26
USPC ......... 701/22, 112, 113, 54, 102; 180/65.265; 123/179.3; 340/426.1
See application file for complete search history.

(56) References Cited

U.S. PATENT DOCUMENTS

| 8,996,223 | B2* | 3/2015 | Kamatani et al. ................ 701/22 |
| 2004/0149246 | A1* | 8/2004 | Itoh et al. .................... 123/179.4 |

(Continued)

FOREIGN PATENT DOCUMENTS

| JP | 2006-141158 A | 6/2006 |
| JP | 2010-178595 A | 8/2010 |
| JP | 2010-242967 A | 10/2010 |

*Primary Examiner* — Gertrude Arthur Jeanglaud
(74) *Attorney, Agent, or Firm* — Sughrue Mion, PLLC

(57) ABSTRACT

When a collision of a vehicle is detected, a control device performs fuel cut of an engine (14) in a case where the engine (14) is in a driven state, and engages an engine connection/disconnection clutch (K0) in a case where the engine connection/disconnection clutch (K0) is disengaged, whereby the rotational resistance of a motor (MG) is increased by drag of the engine (14) and the rotation speed (Nmg) of the motor (MG) after the collision of the vehicle can be speedily reduced. Consequently, generation of an electromotive force by rotation of the motor (MG) is prevented, and it is possible to speedily complete discharge of an inverter circuit (40).

2 Claims, 5 Drawing Sheets

(51) Int. Cl.

| | | |
|---|---|---|
| *B60K 6/24* | (2007.10) | |
| *B60K 6/26* | (2007.10) | |
| *B60K 6/387* | (2007.10) | |
| *B60K 6/48* | (2007.10) | |
| *B60K 28/14* | (2006.01) | |
| *B60W 10/02* | (2006.01) | |
| *B60W 10/06* | (2006.01) | |
| *B60W 10/08* | (2006.01) | |
| *B60W 20/00* | (2016.01) | |

(52) U.S. Cl.
CPC ..... *B60W 2520/105* (2013.01); *B60W 2600/00* (2013.01); *B60W 2710/021* (2013.01); *B60W 2710/06* (2013.01); *B60W 2710/0627* (2013.01); *Y02T 10/6221* (2013.01); *Y02T 10/6252* (2013.01); *Y02T 10/6286* (2013.01); *Y02T 10/6295* (2013.01); *Y10S 903/93* (2013.01)

(56) References Cited

U.S. PATENT DOCUMENTS

| | | | |
|---|---|---|---|
| 2005/0131621 A1* | 6/2005 | Schuster et al. | 701/112 |
| 2008/0262707 A1* | 10/2008 | Yamaguchi | 701/112 |
| 2010/0235029 A1 | 9/2010 | Becker et al. | |

* cited by examiner

CONTROL DEVICE FOR HYBRID VEHICLE FOR CONTROLLING THE HYBRID VEHICLE WHEN A COLLISION IS DETECTED

BACKGROUND OF THE INVENTION

1. Field of the Invention

The invention relates to a control device for a hybrid vehicle, and particularly relates to a control at the time of a vehicle collision.

2. Description of Related Art

There is available a hybrid vehicle that includes an engine and a motor as drive force sources for running, and a clutch that establishes or interrupts a power transmission path between the engine and the motor. In the vehicle including the motor described above, the exchange of electric power between, e.g., the motor and a power storage device (e.g., a secondary cell, a battery) is performed via an inverter circuit. The inverter circuit has a power storage element, and its voltage is relatively high. Consequently, at the time of a vehicle collision, in order to secure safety, it is necessary to speedily reduce the high voltage of the inverter circuit by discharging. Accordingly, various techniques for further improving the safety when the vehicle collides are proposed.

For example, Japanese Patent Application Publication No. 2010-178595 (JP 2010-178595 A) describes a configuration including a first discharging unit that consumes stored electric power of a smoothing capacitor in an inverter circuit by operating first electric equipment that does not influence the driving force of a vehicle when the collision of a vehicle is detected, and a second discharging unit that consumes the stored electric power of the smoothing capacitor by using second electric equipment capable of generating the driving force in a state where the driving force is prevented from being generated in a case where the discharge of the smoothing capacitor is not completed by the first discharging unit. In addition, Japanese Patent Application Publication No. 2006-141158 (JP 2006-141158 A) describes a configuration in which, when the collision of the vehicle is detected, the power transmission path of the vehicle is interrupted, and the stored electric power of the smoothing capacitor is discharged after the interruption of the power transmission path.

SUMMARY OF THE INVENTION

In the vehicle including the engine and the motor, at the time of the vehicle collision, it is necessary to perform the discharge in order to speedily reduce the high voltage of the inverter circuit. However, there are cases where the motor continues to rotate at the time of the vehicle collision, and an electromotive force is generated by the rotation of the motor in these cases, and hence it has been difficult to speedily reduce the voltage of the inverter circuit.

The invention provides a control device for a hybrid vehicle capable of speedily completing the discharge of the inverter circuit at the time of the vehicle collision in the vehicle that includes the engine and the motor as the driving force sources for running and the clutch that establishes or interrupts the power transmission path between the engine and the motor.

An aspect of the invention relates to a control device for a hybrid vehicle including an engine, a motor, and a clutch. The control device includes a collision detector configured to detect a collision of the hybrid vehicle, and a controller configured to perform fuel cut of the engine in a case where the engine is in a driven state when the collision detector detects the collision. The controller is configured to engage the clutch in a case where the clutch is disengaged when the collision detector detects the collision. The clutch is provided in a power transmission path between the engine and the motor.

With this, when the collision of the vehicle is detected, the fuel cut of the engine is performed in the case where the engine is in the driven state, and the engagement of the clutch is performed in the case where the clutch is disengaged, whereby the rotational resistance of the motor is increased by drag of the engine and the rotation speed of the motor after the collision of the vehicle can be speedily reduced. Consequently, generation of an electromotive force by the rotation of the motor is prevented, and it is possible to speedily complete discharge of an inverter circuit.

In the control device, the controller is configured to disengage the clutch when the rate of change of the rotation speed of the engine is positive after the collision. In the case where the rate of change of the rotation speed of the engine is positive after the vehicle collision, the rotation speed of the engine is increased with a lapse of time and, when the clutch is engaged, the rotation speed of the motor is increased, and it takes time to discharge the inverter circuit. In such a case, by disengaging the clutch, it is possible to prevent the increase in the rotation speed of the motor to thereby reduce the discharge time.

In the control device, the controller is configured to engage the clutch when the rate of change of the rotation speed of the engine is negative after the collision and when the rotation speed of the engine is lower than a rotation speed of the motor after the collision. In such a case, by engaging the clutch, the engine functions as the rotational resistance of the motor, the rotation speed of the motor is speedily reduced, and it is possible to speedily complete the discharge of the inverter circuit.

BRIEF DESCRIPTION OF THE DRAWINGS

Features, advantages; and technical and industrial significance of exemplary embodiments of the invention will be described below with reference to the accompanying drawings, in which like numerals denote like elements, and wherein.

DETAILED DESCRIPTION OF EMBODIMENTS

Figure 1:
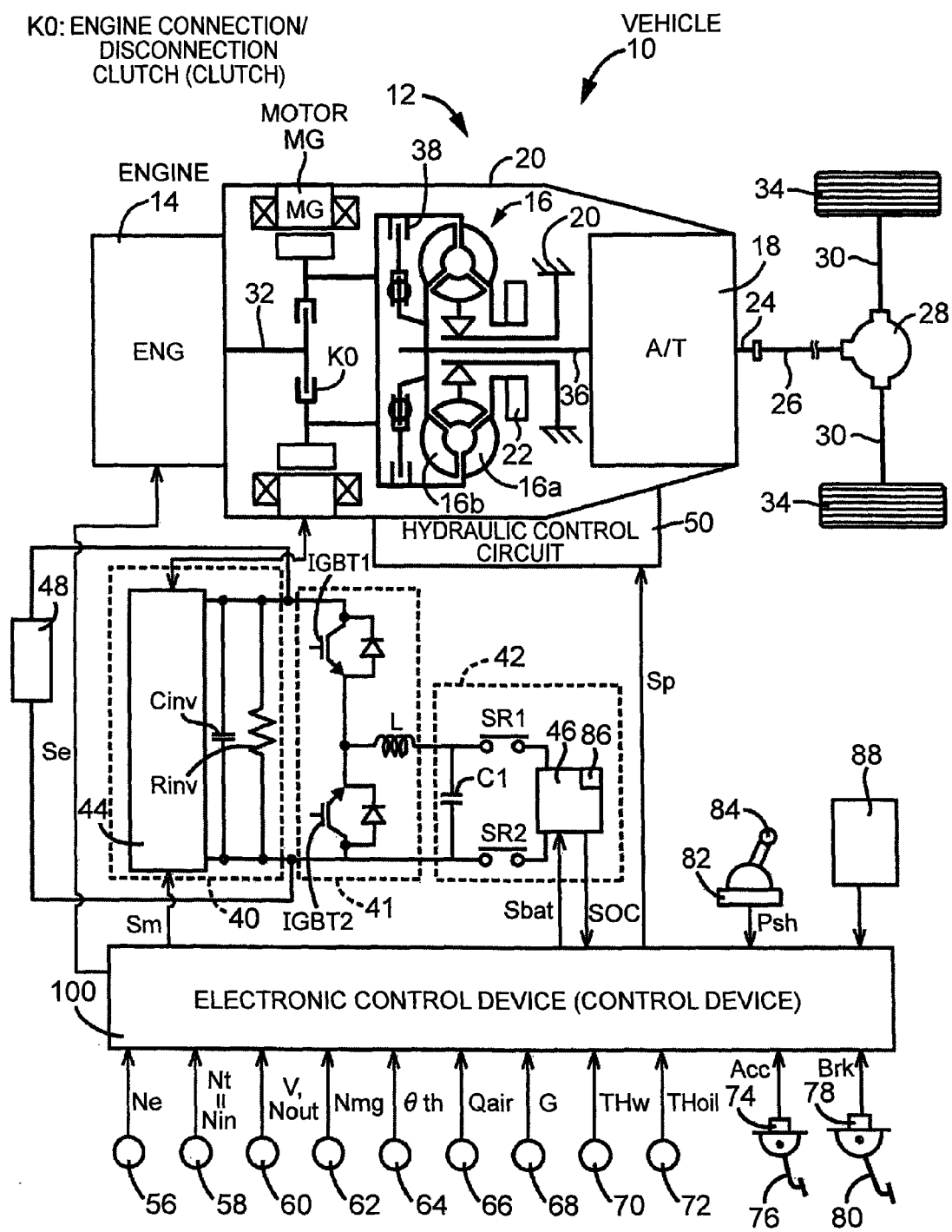
FIG. 1 is a view for explaining the schematic configuration of a power transmission path constituting a hybrid vehicle to which the invention is applied, and is also a view for explaining the principal portion of a control system provided in the vehicle.

Hereinbelow, a first embodiment of the invention will be described in detail with reference to the drawings. In the following embodiments, the drawings are appropriately simplified or modified, and dimensions and shapes of individual portions in the drawings are not necessarily precise.

FIG. 1 is a view for explaining the schematic configuration of the power transmission path from an engine 14 to drive wheels 34 constituting a hybrid vehicle 10 (hereinafter referred to as a vehicle 10) to which the invention is preferably applied, and is also a view for explaining the principal portion of a control system provided in the vehicle 10 for an output control of the engine 14 functioning as a driving force source for running, a gear shift control of an automatic transmission 18, and a drive control of a motor MG.

In FIG. 1, a vehicle power transmission device 12 (hereinafter referred to as a power transmission device 12) includes an engine connection/disconnection clutch K0, the motor MG, a torque converter 16, an oil pump 22, and the automatic transmission 18 that are arranged in this order from the side of the engine 14 in a transmission case 20 (hereinafter referred to as a case 20) as a non-rotary member attached to a vehicle body by means of bolting or the like. In addition, the power transmission device 12 includes a propeller shaft 26 connected to an output shaft 24 as an output rotary member of the automatic transmission 18, a differential gear 28 connected to the propeller shaft 26, and a pair of axle shafts 30 connected to the differential gear 28. The power transmission device 12 configured in this manner is preferably used in, e.g., a front engine rear drive (FR) vehicle 10. In the power transmission device 12, in a case where the engine connection/disconnection clutch K0 is engaged, power of the engine 14 is transmitted to a pair of the drive wheels 34 from an engine connecting shaft 32 that connects the engine 14 and the engine connection/disconnection clutch K0 via the engine connection/disconnection clutch K0, the torque converter 16, the automatic transmission 18, the propeller shaft 26, the differential gear 28, and the pair of axle shafts 30. Note that the engine connection/disconnection clutch K0 may be regarded as a clutch of the invention provided in the power transmission path between the engine and the motor.

The torque converter 16 is a fluid type power transmission device that transmits the driving force inputted to a pump impeller 16a toward the automatic transmission 18 via a fluid. The pump impeller 16a is connected to the engine 14 via the engine connection/disconnection clutch K0 and the engine connecting shaft 32, and is an input side rotary element to which the driving force from the engine 14 is inputted and that is rotatable about an axis. A turbine impeller 16b of the torque converter 16 is an output side rotary element of the torque converter 16, and is connected to a transmission input shaft 36 as the input rotary member of the automatic transmission 18 so as not to be relatively rotatable by spline fitting or the like. In addition, the torque converter 16 includes a lock-up clutch 38. The lock-up clutch 38 is a direct clutch provided between the pump impeller 16a and the turbine impeller 16b, and is brought into an engaged state, a slipped state, or a disengaged state by a hydraulic control.

The motor MG is what is called a motor generator having the function as a motor that generates a mechanical driving force from electric energy and the function as a generator that generates the electric energy from mechanical energy. In other words, the motor MG can function as a substitute for the engine 14 as a power source or can function as the driving force source for running that generates the driving force for running together with the engine 14. In addition, the motor MG performs an operation in which the electric energy is generated from the driving force generated by the engine 14 and a driven force (the mechanical energy) inputted from the side of the drive wheels 34 by means of regeneration, and the electric energy is stored in a battery unit 42 via the inverter circuit 40 and a step-up converter circuit 41. The motor MG is operationally connected to the pump impeller 16a, and the power is mutually transmitted between the motor MG and the pump impeller 16a. Consequently, similarly to the engine 14, the motor MG is connected to the transmission input shaft 36 in a power transmittable manner. The motor MG is connected to the battery unit 42 via the inverter circuit 40 and the step-up converter circuit 41.

The inverter circuit 40 is an electric circuit including an inverter section 44 that controls the exchange of electric power related to the operation of the motor MG, an inverter capacitor Cinv as a power storage element that temporarily stores the electric power, and a discharge resistor Rinv provided in parallel with the inverter capacitor Cinv. The inverter section 44 includes, e.g., a conventional switching element, and the switching operation of the switching element is controlled with a command from an electronic control device (control device) 100 described later such that a requested output torque or a requested regenerative torque can be obtained from the motor MG. The inverter capacitor Cinv is, e.g., a smoothing capacitor for smoothing the voltage on the side of the battery unit 42 in the inverter section 44.

The step-up converter circuit 41 includes, e.g., conventional switching elements (insulated gate bipolar transistor (IGBT)1, IGBT2) and a reactor L, and the voltage can be increased or reduced by switching on/off of the switching elements (IGBT1, IGBT2) with the command from the electronic control device 100 described later.

The battery unit 42 includes a battery section 46 as a rechargeable secondary battery such as, e.g., a lithium-ion battery pack or a nickel-metal hydride battery pack, system relays SR1 and SR2 that open or close the electric path between the inverter circuit 40 and the step-up converter circuit 41 with the command from the electronic control device 100 (i.e., connect or disconnect the battery section 46 to or from the inverter circuit 40 and the step-up converter 41), and a capacitor C1.

The oil pump 22 is connected to the pump impeller 16a, and is a mechanical oil pump that generates a hydraulic oil pressure for shifting a gear in the automatic transmission 18, controlling the torque capacity of the lock-up clutch 38, controlling the engagement/disengagement of the engine connection/disconnection clutch K0, and supplying lubricating oil to individual portions of the power transmission path of the vehicle 10 by being rotationally driven by the engine 14 (or the motor MG).

The engine connection/disconnection clutch K0 is a wet multiple-disk hydraulic frictional engagement device in which a plurality of friction disks stacked on each other are pressed by a hydraulic actuator, and an engagement/disengagement control is performed on the engine connection/disconnection clutch K0 by a hydraulic control circuit 50 provided in the power transmission device 12 by using the hydraulic pressure generated by the oil pump 22 as a source pressure. In the engagement/disengagement control, the torque capacity of the engine connection/disconnection clutch K0 that can transmit the power, i.e., the engagement force of the engine connection/disconnection clutch K0 is continually changed through a pressure control by a linear solenoid valve or the like in the hydraulic control circuit 50. The engine connection/disconnection clutch K0 includes a pair of clutch rotary members (a clutch hub and a clutch drum) that can rotate relative to each other in the disengaged state. One of the clutch rotary members (the clutch hub) is connected to the engine connecting shaft 32 so as not to be capable of the relative rotation, while the other of the rotary members (the clutch drum) is connected to the pump impeller 16a of the torque converter 16 so as not to be capable of the relative rotation. With the configuration described above, in the engaged state, the engine connection/disconnection clutch K0 causes the pump impeller 16a to rotate integrally with the engine 14 via the engine connecting shaft 32. That is, in the engaged state of the engine connection/disconnection clutch K0, the driving force from the engine 14 is inputted to the pump impeller 16a. On the other hand, in the disengaged state of the engine connection/disconnection clutch K0, the power transmission between the pump impeller 16a and the engine 14 is interrupted. In addition, as described above, since the motor MG is operationally connected to the pump impeller 16a, the engine connection/disconnection clutch K0 functions as the clutch that establishes or interrupts the power transmission path between the engine 14 and the motor MG. Further, in the engine connection/disconnection clutch K0 of the present embodiment, what is called a normally-open clutch in which the torque capacity (the engagement force) increases in proportion to the hydraulic pressure and the disengaged state is established when the hydraulic pressure is not supplied is used.

The automatic transmission 18 is connected to the motor MG without the intervention of the engine connection/disconnection clutch K0 in the power transmittable manner, constitutes a part of the power transmission path from the engine 14 to the drive wheels 34, and transmits the power from the driving force sources for running (the engine 14 and the motor MG) to the side of the drive wheels 34. The automatic transmission 18 is a planetary gear type multi-step transmission functioning as a stepped automatic transmission in which gear shift is executed by selective engagement of a plurality of engagement devices, e.g., any of the hydraulic frictional engagement devices such as a clutch C and a brake B (i.e., the engagement and disengagement of the hydraulic frictional engagement device), and a plurality of shift stages (gears) are thereby selectively established. That is, the automatic transmission 18 is the stepped transmission that is often used in conventional vehicles and performs what is called a clutch-to-clutch transmission, and varies the rotation of the transmission input shaft 36 and outputs the varied rotation from the output shaft 24. In addition, the transmission input shaft 36 is also a turbine shaft that is rotationally driven by the turbine impeller 16b of the torque converter 16. In the automatic transmission 18, by the engagement/disengagement control of the clutch C and the brake B, a specific gear (shift stage) is established in response to the accelerator operation by a driver or a vehicle speed V. In addition, when both of the clutch C and the brake B of the automatic transmission 18 are disengaged, a neutral state is established, and the power transmission path between the drive wheels 34, and the engine 14 and the motor MG is interrupted. With this, the automatic transmission 18 functions as a connection/disconnection device that establishes or interrupts the power transmission path between the engine 14 and the motor MG, and the drive wheels 34.

Returning to FIG. 1, the vehicle 10 includes the electronic control device 100 including control devices related to, e.g., a hybrid drive control or the like. The electronic control device 100 is constituted by what is called a microcomputer including, e.g., a central processing unit (CPU), a random access memory (RAM), a read only memory (ROM), and an input/output interface, and the CPU executes various controls of the vehicle 10 by performing signal processing according to programs pre-stored in the ROM while utilizing the temporary storage function of the RAM. For example, the electronic control device 100 executes the output control of the engine 14, the drive control of the motor MG including the regeneration control of the motor MG; the gear shift control of the automatic transmission 18, the torque capacity control of the lock-up clutch 38, and the torque capacity control of the engine connection/disconnection clutch K0, and is constituted to be divided into portions for the engine control, for the motor control, or for the hydraulic control (for the gear shift control) on an as needed basis.

To the electronic control device 100, for example, there are supplied a signal indicative of an engine rotation speed Ne as the rotation speed of the engine 14 detected by an engine rotation speed sensor 56, a signal indicative of a turbine rotation speed Nt of the torque converter 16 as the input rotation speed of the automatic transmission 18 detected by a turbine rotation speed sensor 58, i.e., a transmission input rotation speed Nin as the rotation speed of the transmission input shaft 36, a signal indicative of a transmission output rotation speed Nout as the rotation speed of the output shaft 24 corresponding to the vehicle speed V (or the rotation speed of the propeller shaft 26 or the like) as a vehicle speed related value detected by an output shaft rotation speed sensor 60, a signal indicative of a motor rotation speed Nmg as the rotation speed of the motor MG detected by a motor rotation speed sensor 62, a signal indicative of a throttle valve opening degree θth as the opening degree of an electronic throttle valve (not shown) detected by a throttle sensor 64, a signal indicative of an intake air quantity Qair of the engine 14 detected by an intake air quantity sensor 66, a signal indicative of a longitudinal acceleration G (or a longitudinal deceleration G) of the vehicle. 10 detected by an acceleration sensor 68, a signal indicative of a cooling water temperature THw of the engine 14 detected by a cooling water temperature sensor 70, a signal indicative of an oil temperature THoil of a hydraulic oil in the hydraulic control circuit 50 detected by an oil temperature sensor 72, a signal indicative of an accelerator depression amount Acc as the operation amount of an accelerator pedal 76 as a driving force request amount (a driver request output) to the vehicle 10 by the driver detected by an accelerator depression amount sensor 74, a signal indicative of a brake operation amount Brk as the operation amount of a brake pedal 80 as a braking force request amount (a driver request deceleration) to the vehicle 10 by the driver detected by a foot brake sensor 78, a signal indicative of a lever position (a shift operation position, a shift position, or an operation position) Psh of a shift lever 84 such as a conventional "P", "N", "D", "R", or "S" position detected by a shift position sensor 82, and the state of charge (a charge capacity) SOC of the battery section 46 detected by a battery sensor 86. Note that electric power is supplied to the electronic control device 100 from an auxiliary battery 88 charged with electric power of which the voltage is reduced by a DCDC converter that is not shown.

In addition, from the electronic control device 100, there are outputted, e.g., an engine output control command signal Se for the output control of the engine 14, a motor control command signal Sm for controlling the operation of the motor MG, and a hydraulic command signal Sp for operating an electromagnetic valve (solenoid valve) or the like included in the hydraulic control circuit 50 in order to control the engine connection/disconnection clutch K0, and the hydraulic actuator of the clutch C and the brake B of the automatic transmission 18.

Figure 2:
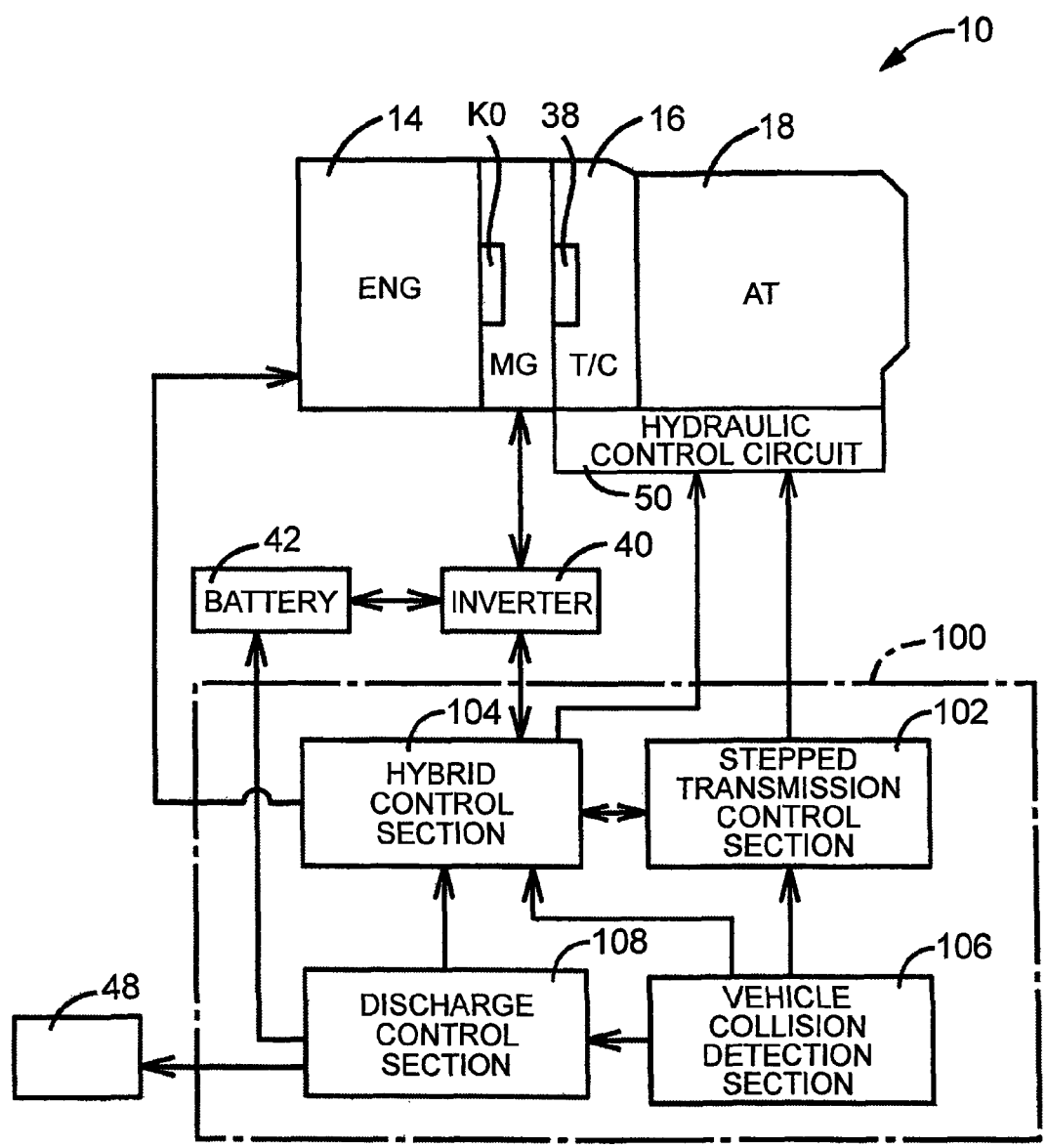
FIG. 2 is a functional block diagram for explaining the principal part of the control function of an electronic control device of FIG. 1.

FIG. 2 is a functional block diagram for explaining the principal part of a control function by the electronic control device 100. In FIG. 2, a stepped transmission control section 102 functions as a gear shift control section that performs the gear shift of the automatic transmission 18. The stepped transmission control section 102 determines whether or not the gear shift of the automatic transmission 18 is executed based on a vehicle state indicated by the actual vehicle speed V and accelerator depression amount Acc from a pre-stored conventional relationship (a gear shift diagram, a gear shift map) having an up-shift line and a down-shift line using the vehicle speed V and the accelerator depression amount Acc (or the transmission output torque Tout) as variables. That is, the stepped transmission, control section 102 determines the shift stage of the automatic transmission 18 to be established, and executes the automatic gear shift control of the automatic transmission 18 such that the determined shift stage is obtained. For example, in a case where the accelerator depression amount Acc (a vehicle request torque) is increased in response to an increase in the accelerator depression amount Acc by the depression operation of the accelerator pedal 76 to go beyond the down-shift line to the side of a high accelerator depression amount (a high vehicle request torque), the stepped transmission control section 102 determines that a down-shift request of the automatic transmission 18 is made, and executes a down-shift control of the automatic transmission 18 corresponding to the down-shift line. At this point, the stepped transmission control section 102 outputs the command (a gear shift output command, hydraulic command) Sp that engages and/or disengages the engagement device related to the gear shift of the automatic transmission 18 to the hydraulic control circuit 50 such that the shift stage is achieved according to, e.g., a pre-stored specific operation table. The hydraulic control circuit 50 operates the linear solenoid valve in the hydraulic control circuit 50 to operate the hydraulic actuator of the engagement device related to the gear shift such that the gear shift of the automatic transmission 18 is executed by, e.g., disengaging a disengagement side engagement device (a disengagement side clutch) and engaging an engagement side engagement device (an engagement side clutch) according to the command Sp.

A hybrid control section (controller) 104 has the function as an engine drive control section that controls the drive of the engine 14 and the function as a motor operation control section that controls the operation of the motor MG as the driving force source or the generator via the inverter circuit 40, and executes the hybrid drive control by the engine 14 and the motor MG using the control functions. For example, the hybrid control section 104 calculates the vehicle request torque from the accelerator depression amount Acc and the vehicle speed V, and controls the driving force sources for running such that the output torques of the driving force sources for running (the engine 14 and the motor MG) with which the calculated vehicle request torque is obtained are achieved in consideration of a transmission loss, an auxiliary equipment load, the shift stage of the automatic transmission 18, and the charge capacity SOC of the battery section 46.

More specifically, in a case where the above-described vehicle request torque is in a range in which the vehicle request torque is obtained only by the output torque (a motor torque) Tmg of the motor MG, the hybrid control section 104 sets a running mode to a motor running mode (hereinafter referred to as an electric vehicle (EV) running mode), and performs a motor running (an EV running) that uses only the motor MG as the driving force source for running. On the other hand, in a case where the above-described vehicle request torque is in a range in which the vehicle request torque is not obtained without using at least the output torque (engine torque) Te of the engine 14, the hybrid control section 104 sets the running mode to an engine running mode, and performs an engine running that uses at least the engine 14 as the driving force source for running.

Note that examples of the vehicle request torque include a driving torque at the time of a driving operation in which the side of the drive wheels 34 is rotationally driven from the side of the engine 14, and a braking torque corresponding to a target deceleration G* at the time of a driven operation in which the side of the engine 14 (the side of the motor MG) is rotationally driven from the side of the drive wheels 34, i.e., a driven torque. Consequently, the vehicle request torque is a positive torque at the time of the driving operation, while the vehicle request torque is a negative torque at the time of the driven operation. Further, the vehicle request torque can be converted into a transmission output torque Tout as the torque on the output shaft 24, a transmission input torque Tat as the torque on the transmission input shaft 36, or the input torque of the power transmission device 12 as the torque inputted to the pump impeller 16a. Accordingly, as the vehicle request torque, in addition to the output torque in the drive wheels 34, it is also possible to use the transmission output torque Tout, the transmission input torque Tat, and the input torque of the power transmission device 12. In addition, as the vehicle request torque, it is also possible to use the accelerator depression amount Acc, the throttle valve opening degree θth, and the intake air quantity Qair.

In a case where the EV running is performed, the hybrid control section 104 disengages the engine connection/disconnection clutch K0 to interrupt the power transmission path between the engine 14 and the torque converter 16, and causes the motor MG to output the motor torque Tmg required for the motor running. On the other hand, in a case where the engine running is performed, the hybrid control section 104 engages the engine connection/disconnection clutch K0 to transmit the driving force from the engine 14 to the pump impeller 16a, and causes the motor MG to output an assisting torque on an as needed basis.

In addition, in a case where, e.g., the accelerator pedal 76 is depressed during the EV running, the vehicle request torque is thereby increased, and the motor torque Tmg required for the EV running corresponding to the vehicle request torque exceeds a specific EV running torque range in which the EV running can be performed, the hybrid control section 104 switches the running mode from the EV running mode to the engine running mode, and starts the engine 14 to perform the engine running. When the engine 14 is started, the hybrid control section 104 transmits an engine start torque Tmgs for starting the engine from the motor MG via the engine connection/disconnection clutch K0 to rotationally drive the engine 14 while engaging the engine connection/disconnection clutch K0 so as to achieve complete engagement thereof, and controls engine ignition and fuel supply while increasing the engine rotation speed Ne to a specific rotation speed or more, whereby the hybrid control section 104 starts the engine 14. Subsequently, the hybrid control section 104 completely engages the engine connection/disconnection clutch K0 speedily after the engine 14 is started.

In addition, in the vehicle 10 of the present embodiment, for example, in a case where an ignition switch is turned off, the system relays SR1 and SR2 are opened (turned off) with a power source control command signal Sbat from the electronic control device 100, and the electric power supply to the inverter circuit 40 is interrupted. With this, charges are no longer stored in the inverter capacitor Cinv, and hence charges having been stored up to this moment are discharged by the discharge resistor Rinv provided in parallel with the inverter capacitor Cinv.

Incidentally, when the collision of the vehicle 10 occurs, similarly to the case where the ignition switch is turned off, the discharge of the inverter circuit 40 is performed by, e.g., the discharge resistor Rinv. Alternatively, it is also possible to execute the discharge by operating high-voltage equipment 48 such as an air conditioner or short-circuiting both of the switching elements IGBT1 and IGBT2. Herein, it is preferable to speedily complete the discharge at the time of the collision of the vehicle 10. However, when the rotation of the motor MG continues at the time of the collision, the electromotive force resulting from the rotation of the motor MG is generated, and it becomes difficult to speedily complete the discharge. Consequently, when the collision of the vehicle 10 is detected, it is desired to speedily reduce the rotation speed Nmg (the motor rotation speed Nmg) of the motor MG to prevent the generation of the electromotive force by the rotation of the motor MG. Accordingly, when the collision of the vehicle 10 is detected, the electronic control device 100 of the present embodiment executes a control that forcibly reduces the rotation speed Nmg of the motor MG. Hereinbelow, the control operation when the collision of the vehicle 10 occurs will be described.

Returning to FIG. 2, a vehicle collision detection section (a collision detector) 106 detects the collision of the vehicle 10. The vehicle collision detection section 106 detects the collision of the vehicle 10 based on, e.g., that the deceleration G (the longitudinal deceleration or the lateral deceleration) detected by the acceleration sensor 68 reaches a collision determination value that is predetermined and pre-stored as the change of the deceleration G with which it can be determined that the collision of the vehicle 10 has occurred. In a case where the occurrence of the collision of the vehicle 10 is detected by the vehicle collision detection section 106, a discharge control section 108 outputs the power source control command signal Sbat for turning off the system relays SR1 and SR2 to the battery unit 42 to interrupt the battery section 46 from the inverter circuit 40. In addition, the discharge control section 108 executes the discharge by operating the high-voltage equipment 48 such as, e.g., the air conditioner or the like or short-circuiting both of the switching elements IGBT1 and IGBT2.

When the collision of the vehicle 10 is detected by the vehicle collision detection section 106, in a case where the engine 14 is a driven state, the hybrid control section 104 outputs the engine control command signal Se for executing fuel cut of the engine 14 by stopping the fuel supply to the engine 14 and turning off an ignition signal to engine output control devices such as a fuel injection device and an ignition device. Note that, in a case where the fuel cut of the engine 14 is already performed such as during the motor running or the like, the hybrid control section 104 performs the control such that the fuel cut is maintained.

In addition, when the collision of the vehicle 10 is detected by the vehicle collision detection section 106, in order to reduce the motor rotation speed Nmg of the motor MG, the hybrid control section 104 outputs a command for bringing the automatic transmission 18 into a neutral state by disengaging the clutch C and the brake B provided in the automatic transmission 18 to the hydraulic control circuit 50. That is, the power transmission path between the motor MG and the drive wheels 34 is interrupted. With this, the motor MG is prevented from being rotated by the transmission of the rotation from the drive wheels 34 after the vehicle collision. Note that, in a case where the automatic transmission 18 is already in the neutral state at the point of time of the vehicle collision, the neutral state is controlled to be maintained.

Further, when the collision of the vehicle 10 is detected by the vehicle collision detection section 106, in order to reduce the motor rotation speed Nmg of the motor MG, the hybrid control section 104 outputs a command for engaging the engine connection/disconnection clutch K0 to the hydraulic control circuit 50 in a case where the engine connection/disconnection clutch K0 is in a disengaged state. For example, in a case where the vehicle 10 collides when the vehicle runs in the EV running mode, since the engine connection/disconnection clutch K0 is disengaged, the engine connection/disconnection clutch K0 is engaged. On the other hand, in a case where the engine connection/disconnection clutch K0 is already engaged at the point of time of the detection of the collision such as a case where the vehicle runs in the engine running mode in which the engine 14 is used as the driving force source, the engagement of the engine connection/disconnection clutch K0 is maintained.

With the control described above, the engine rotation speed Ne is reduced by the fuel cut of the engine 14, and the engine 14 and the motor MG are connected to each other by the engagement of the engine connection/disconnection clutch K0, and hence the engine 14 functions as a rotational resistance, the rotational resistance of the motor MG is thereby increased, and the rotation speed Nmg of the motor MG is speedily reduced. Consequently, the generation of the electromotive force by the rotation of the motor MG is prevented, and the discharge of the inverter circuit 40 (the inverter capacitor Cinv) is speedily completed by the discharge resistor Rinv and the above-described discharge control by the discharge control section 108.

Figure 3:
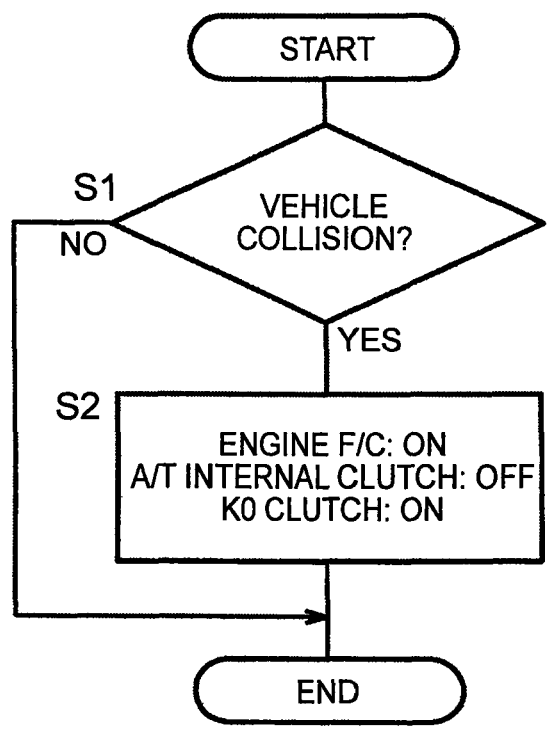
FIG. 3 is a flowchart for explaining the principal part of the control operation of the electronic control device, i.e., the control operation that forcibly reduces the rotation speed of a motor in order to speedily complete discharge of an inverter circuit when a vehicle collision is detected.

FIG. 3 is a flowchart for explaining the principal part of the control operation of the electronic control device 100, i.e., the control operation that forcibly reduces the rotation speed of the motor MG in order to speedily complete the discharge of the inverter circuit 40 (the inverter capacitor. Cinv) when the collision of the vehicle 10 is detected, and the control operation is repeatedly executed at an extremely short cycle time of, e.g., about several msec to several tens of msec. Note that it is assumed that the discharge control section 108 is operated concurrently when the collision of the vehicle 10 is detected.

In FIG. 3, first in step S1 (hereinafter "step" will be omitted) corresponding to the vehicle collision detection section 106, it is determined whether or not the collision of the vehicle 10 is detected. In a case where the determination in S1 is negative, this routine is ended. On the other hand, in a case where the determination in S1 is affirmative, it is determined (detected) that the collision of the vehicle 10 occurs and, in S2 corresponding to the hybrid control section 104, the fuel cut of the engine 14 is performed (F/C: ON), the automatic transmission 18 is brought into the neutral state by disengaging the engagement device of the automatic transmission 18 (A/T internal clutch: OFF), and the engine connection/disconnection clutch K0 is engaged (K0 clutch: ON). With this, the engine 14 and the motor MG are connected to each other, the engine 14 thereby functions as the rotational resistance that hinders the rotation of the motor MG, the motor rotation speed Nmg is speedily reduced, and the generation of the electromotive force by the rotation of motor MG is prevented. Consequently, by the discharge resistor Rinv and the control operation of the discharge control section 108 executed concurrently with the control operation of this flowchart, the discharge of the inverter circuit 40 (the inverter capacitor Cinv) is speedily completed.

As described above, according to the present embodiment, when the collision of the vehicle is detected, the fuel cut of the engine 14 is performed in the case where the engine 14 is in the driven state, and the engagement of the engine connection/disconnection clutch K0 is performed in the case where the engine connection/disconnection clutch K0 is disengaged, whereby the rotational resistance of the motor MG is increased by drag of the engine 14, and the rotation speed Nmg of the motor MG after the vehicle collision can be speedily reduced. Consequently, the generation of the electromotive force by the rotation of the motor MG is prevented, and it is possible to speedily complete the discharge of the inverter circuit 40.

Next, a second embodiment of the invention will be described. Note that portions common to the above-described embodiment are designated by the same reference numerals and the description thereof will be omitted.

During the running of the vehicle 10, in a case where the vehicle 10 collides when the engine 14 is in a high load state or the engine rotation speed Ne is increasing, even when the fuel cut of the engine 14 is executed immediately after the vehicle collision, there are cases where the engine rotation speed Ne is not reduced, and the engine rotation speed Ne is increased due to inertia or maintained. In these cases, when the engine connection/disconnection clutch K0 is engaged, since the engine rotation speed Ne is high, the motor rotation speed Nmg is not reduced, the electromotive force is generated, and it takes time to discharge the inverter circuit 40 (the inverter capacitor Cinv). In such a case, similarly to the above-described embodiment, the electronic control device 100 performs the fuel cut of the engine 14, brings the automatic transmission 18 into the neutral state, and temporarily releases the engagement of the engine connection/disconnection clutch K0. With this, the reduction of the motor rotation speed Nmg is not prevented by the engagement of the engine connection/disconnection clutch K0, and the motor rotation speed Nmg is reduced. Subsequently, when the engine rotation speed Ne is reduced and the engine rotation speed Ne is reduced to be lower than the motor rotation speed Nmg, the engine connection/disconnection clutch K0 is engaged. With the control described above, the engine 14 and the motor MG are connected to each other in a state where the engine rotation speed Ne is lower than the motor rotation speed Nmg, and hence the engine 14 functions as the rotational resistance and the motor rotation speed Nmg is speedily reduced.

Figure 4:
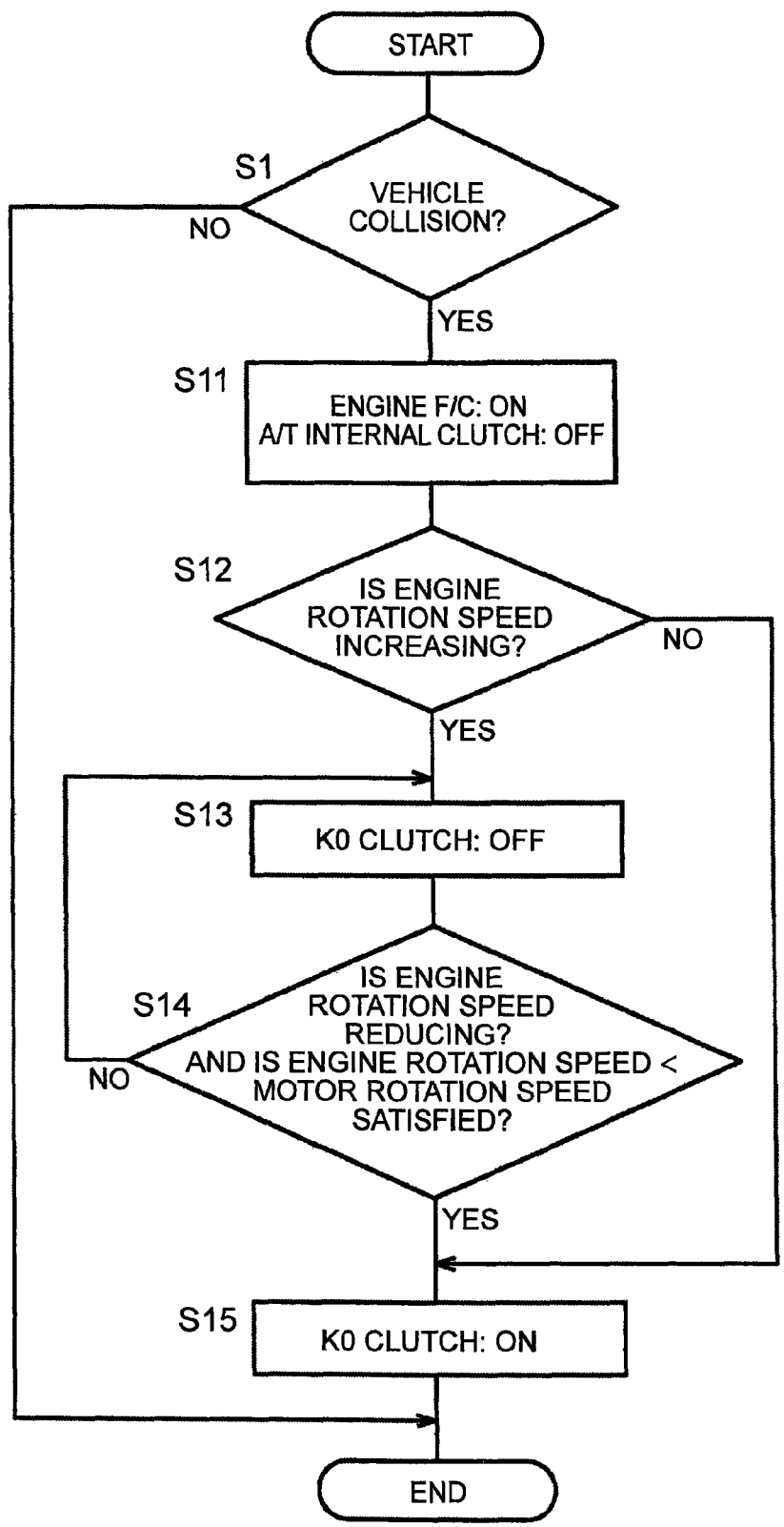
FIG. 4 is a flowchart for explaining the principal part of the control operation of the electronic control device as another embodiment of the invention, i.e., the control operation that forcibly reduces the rotation speed of the motor in order to speedily complete the discharge of the inverter circuit when the vehicle collision is detected.

FIG. 4 is a flowchart for explaining the principal part of the control operation of the electronic control device 100 in the present embodiment, i.e., the control operation that forcibly reduces the rotation speed of the motor in order to speedily complete the discharge of the inverter circuit 40 when the collision of the vehicle 10 is detected. Note that it is assumed that the discharge control section 108 is operated concurrently when the collision of the vehicle 10 is detected.

In FIG. 4, first in S1 corresponding to the vehicle collision detection section 106, it is determined whether or not the collision of the vehicle is detected. In a case where the determination in S1 is negative, this routine is ended. On the other hand, in a case where the determination in S1 is affirmative, in S11 corresponding to the hybrid control section 104, the fuel cut of the engine 14 is performed, and the automatic transmission 18 is brought into the neutral state. Subsequently, in S12 corresponding to the hybrid control section 104, it is determined whether or not the engine rotation speed Ne is in an increasing state, i.e., the rate of change of the engine rotation speed Ne is positive. In a case where the determination in S12 is negative, it is determined that the motor rotation speed Nmg is reduced by connecting the engine 14 and the motor MG to each other and, in S15 corresponding to the hybrid control section 104, the engine connection/disconnection clutch K0 is engaged. In a case where the determination in S12 is affirmative, it is determined that the motor rotation speed Nmg is not reduced if the engine connection/disconnection clutch K0 is engaged and, in S13 corresponding to the hybrid control section 104, the engine connection/disconnection clutch K0 is disengaged. Subsequently, in S14 corresponding to the hybrid control section 104, it is determined whether or not the rotation speed of the engine 14 is reduced and the engine rotation speed Ne is lower than the motor rotation speed Nmg. In a case where the determination in S14 is negative, the flow returns to S13 and the disengagement of the engine connection/disconnection clutch K0 is maintained. On the other hand, in a case where the determination in S14 is affirmative, it is determined that the motor rotation speed Nmg is reduced by connecting the engine 14 and the motor MG to each other and, in S15 corresponding to the hybrid control section 104, the engine connection/disconnection clutch K0 is engaged. With this, the motor rotation speed Nmg is speedily reduced, the generation of the electromotive force by the rotation of the motor MG is prevented, and the discharge after the vehicle collision is speedily completed.

As described above, according to the present embodiment, in the case where the rate of change of the engine rotation speed Ne is positive after the collision of the vehicle, the engine connection/disconnection clutch K0 is disengaged. In the case where the rate of change of the engine rotation speed Ne is positive after the collision of the vehicle, the engine rotation speed Ne is increased with a lapse of time and, when the engine connection/disconnection clutch K0 is engaged, the rotation speed Nmg of the motor MG is increased, the electromotive force by the rotation of the motor MG is generated, and it takes time to discharge the inverter circuit 40. In such a case, by disengaging the engine connection/disconnection clutch K0, it is possible to prevent an increase in the rotation speed of the motor MG to thereby reduce the discharge time.

In addition, according to the present embodiment, when the engine rotation speed Ne is reduced and the engine rotation speed Ne becomes lower than the rotation speed Nmg of the motor MG, the engine connection/disconnection clutch K0 is engaged. In such a case, by engaging the engine connection/disconnection clutch K0, the engine 14 functions as the rotational resistance of the motor MG, the rotation speed Nmg of the motor MG is speedily reduced, and it is possible to speedily complete the discharge of the inverter circuit 40.

Next, a third embodiment of the invention will be described. Note that portions common to the above-described embodiments are designated by the same reference numerals and the description thereof will be omitted. In a case where the vehicle speed V is a low vehicle speed when the vehicle 10 collides, the transmission input rotation speed Nin of the automatic transmission 18 is also a low rotation speed. In such a case, when the motor MG and the drive wheels 34 are connected to each other, the side of the drive wheels 34 functions as the rotational resistance of the motor MG, and the motor rotation speed Nmg is thereby reduced. Accordingly, in the case where the vehicle speed V is the low vehicle speed, the electronic control device 100 (the hybrid control section 104) controls the automatic transmission 18 functioning also as the connection/disconnection device that selectively establishes or interrupts the power transmission path between the engine 14 and the motor MG, and the drive wheels 34 to maintain the power transmission path in a power transmittable state. Specifically, when the vehicle speed V becomes equal to or smaller than a preset specific value α at the time of the vehicle collision, the electronic control device 100 (the hybrid control section 104) maintains the power transmittable state of the automatic transmission 18. With this, the motor rotation speed Nmg is speedily reduced. Note that the specific value α is empirically predetermined, and is set to a low vehicle speed value in the vicinity of zero. In addition, the specific value α may be changed according to the gear (shift stage) of the automatic transmission 18 before the collision. When the motor rotation speed Nmg is reduced to the rotation speed corresponding to the vehicle speed V by maintaining the automatic transmission 18 in the power transmittable state, the automatic transmission 18 is brought into the neutral state, and the motor rotation speed Nmg is further reduced by, e.g., engaging the engine connection/disconnection clutch K0.

Figure 5:
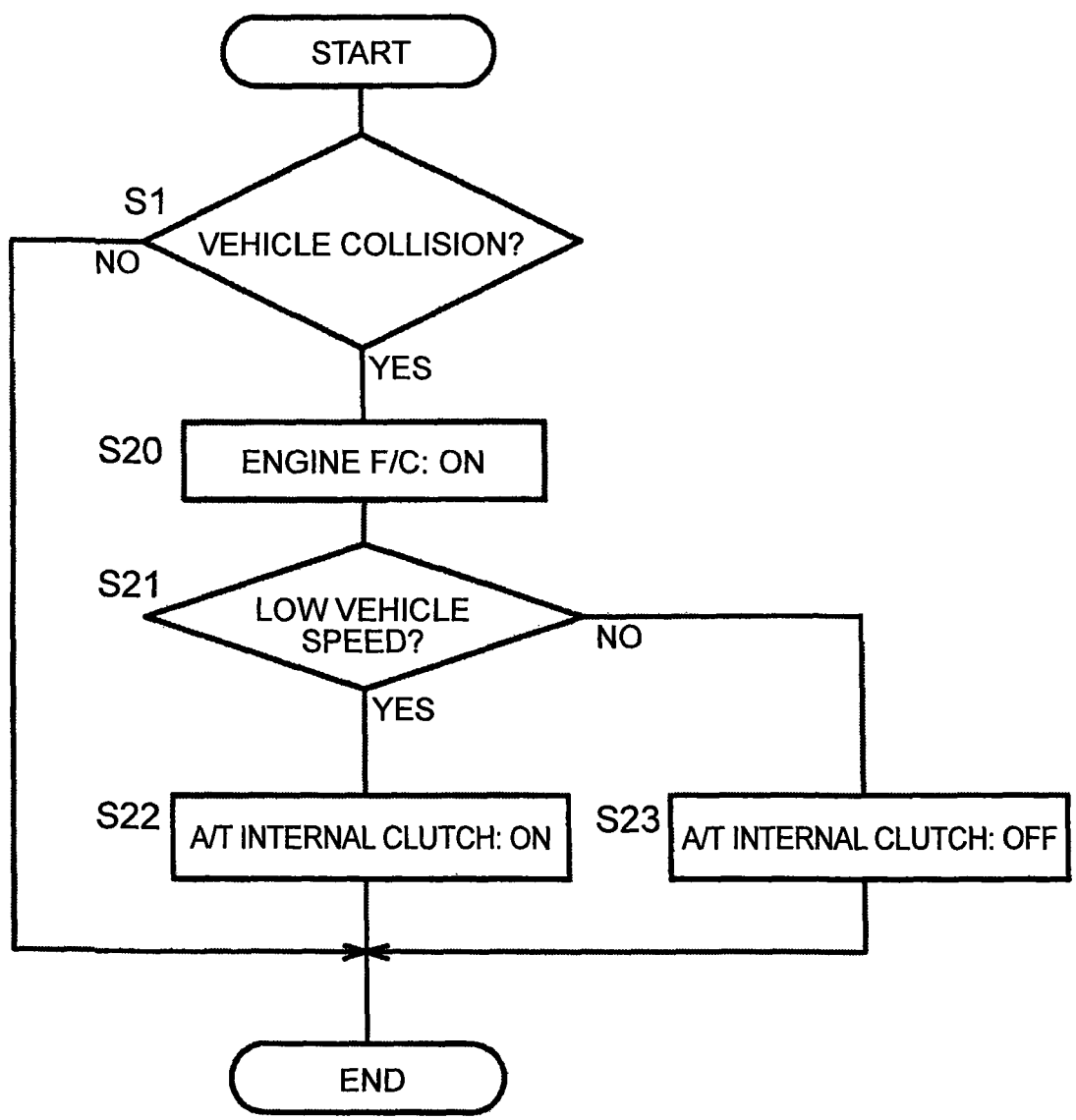
FIG. 5 is a flowchart for explaining the principal part of the control operation of the electronic control device as still another embodiment of the invention, i.e., the control operation that forcibly reduces the rotation speed of the motor in order to speedily complete the discharge of the inverter circuit when the vehicle collision is detected.

FIG. 5 is a flowchart for explaining the principal part of the control operation of the electronic control device 100 in the present embodiment, i.e., the control operation that forcibly reduces the rotation speed of the motor in order to speedily complete the discharge of the inverter circuit 40 (the inverter capacitor Cinv) when the collision of the vehicle 10 is detected. Note that it is assumed that the discharge control section 108 is operated concurrently when the collision of the vehicle 10 is detected.

In FIG. 5, first in S1 corresponding to the vehicle collision detection section 106, it is determined whether or not the collision of the vehicle is detected. In a case where the determination in S1 is negative, this routine is ended. On the other hand, in a case where the determination in S1 is affirmative, in S20 corresponding to the hybrid control section 104, the fuel cut of the engine 14 is performed. Subsequently, in S21 corresponding to the hybrid control section 104, it is determined whether or not the vehicle speed V is equal to or smaller than the preset specific value α. In a case where the determination in S21 is affirmative, in S22 corresponding to the hybrid control section 104, the motor rotation speed Nmg is speedily reduced by maintaining the power transmission path of the automatic transmission 18 (A/T internal clutch: ON). On the other hand, in a case where the determination in S21 is negative, in S23 corresponding to the hybrid control section 104, the automatic transmission 18 is brought into the neutral state (A/T internal clutch: OFF), and the motor rotation speed Nmg is reduced by engaging the engine connection/disconnection clutch K0.

As described above, according to the present embodiment, in the case where the vehicle speed V after the vehicle collision is equal to or smaller than the preset specific value α, the automatic transmission 18 is brought into the power transmittable state. With this, in the case where the vehicle speed V is the low speed, by connecting the motor MG and the drive wheel 34 to each other in the power transmittable manner, it is possible to speedily reduce the rotation speed Nmg of the motor MG to the rotation speed corresponding to the vehicle speed V.

In the embodiments described above, in the power transmission path between the motor and the drive wheels, the connection/disconnection device that selectively establishes or interrupts the power transmission path is provided, and interrupts the power transmission path when the collision of the vehicle is detected. With this, it is possible to prevent the transmission of the rotation from the drive wheels after the vehicle collision from hindering the reduction in the rotation speed of the motor.

In the embodiments described above, in the case where the vehicle speed after the collision is equal to or smaller than the preset specific value, the connection/disconnection device is engaged. With this, in the case where the vehicle speed is low, by connecting the motor and the drive wheels in the power transmittable manner, it is possible to speedily reduce the rotation speed of the motor to the rotation speed corresponding to the vehicle speed.

In the embodiments described above, the discharge of the inverter circuit is appropriately executed by the discharge resistor and a current control element provided in the inverter circuit in a state where the electric power supply to the inverter circuit is interrupted.

Although the embodiments of the invention have been described in detail based on the drawings thus far, the invention is applied in other modes.

For example, in the embodiments described above, although the individual embodiments are implemented independently of each other, it is not always necessary to implement the individual embodiments independently of each other, and may be appropriately combined and implemented.

In addition, in the embodiments described above, although the engine connection/disconnection clutch K0 brings the automatic transmission 18 into the neutral state in a state where the hydraulic path is not secured, i.e., in a state where the hydraulic pressure is not supplied, a configuration may also be adopted in which only the torque capacity of a specific value can be transmitted in the state where the hydraulic pressure is not supplied. With the above configuration, even when it becomes difficult to supply the hydraulic pressure due to, e.g., the collision of the vehicle 10, the engine 14 and the motor MG are half-engaged with each other, the engine 14 functions as the rotational resistance, and the motor rotation speed Nmg is thereby reduced. Alternatively, a configuration can also be adopted in which an accumulator that accumulates the hydraulic pressure or an electric oil pump is provided in preparation for a case where the oil pump 22 becomes inoperable after the vehicle collision. With the above configuration, it also becomes possible to supply the hydraulic pressure to the engine connection/disconnection clutch K0, and the clutch C and the brake B of the automatic transmission 18 after the vehicle collision.

Further, in the embodiments described above, although there is provided the stepped automatic transmission 18 in which gear shift is executed by selective engagement of any of the hydraulic frictional engagement devices such as the clutch C and the brake B (i.e., the engagement and disengagement of the hydraulic frictional engagement device), and the plurality of shift stages (gears) are thereby selectively established, the transmission is not limited thereto and, for example, a stepless automatic transmission may also be used appropriately.

Furthermore, in the embodiments described above, although the torque converter 16 is used as the fluid type power transmission device, the torque converter 16 is not necessarily required. Instead of the torque converter 16, other fluid type power transmission devices such as a fluid coupling that does not have a torque amplification function and the like may also be used.

Moreover, in the embodiments described above, although the discharge of the inverter circuit 40 is performed by, e.g., the operation the discharge resistor Rinv or the high-voltage equipment 48 or the short circuit of the system relays SR1 and SR2, the discharge thereof may be executed by switching of the switching elements provided in the inverter section 44. Alternatively, the discharge thereof may also be executed by appropriately combining the discharge devices.

Additionally, although each of the embodiments described above is described as the control executed at the time of the vehicle collision, the same control may be executed at the time of ignition-off. By executing the control, it is possible to complete the discharge of the inverter capacitor Cinv more speedily at the time of ignition-off.

In addition, in the embodiments described above, although the collision of the vehicle 10 is detected based on that the deceleration G reaches the preset collision determination value, for example, a plurality of strain sensors are provided at specific positions of the vehicle body, and the collision of the vehicle 10 may be detected based on that the strain detected by the strain sensor reaches a preset determination value.

Note that the embodiments described above are only exemplary embodiments, and the invention can be implemented in modes employing various modifications and improvements based on the knowledge of a person skilled in the art.

The invention claimed is:

1. A control device for a hybrid vehicle, the hybrid vehicle including an engine, a motor, and a clutch provided in a power transmission path between the engine and the motor, the control device comprising:
    a collision detector configured to detect a collision of the hybrid vehicle; and
    a controller configured to:
    (a) perform fuel cut of the engine in a case where the engine is in a driven state when the collision detector detects the collision;
    (b) engage the clutch in a case where the clutch is disengaged when the collision detector detects the collision; and
    (c) disengage the clutch when a rate of change of a rotation speed of the engine is positive after the collision.

2. The control device according to claim 1, wherein the controller is configured to engage the clutch when the rate of change of the rotation speed of the engine is negative after the collision and when the rotation speed of the engine is lower than a rotation speed of the motor after the collision.

* * * * *